(12) United States Patent
Jehanno et al.

(10) Patent No.: US 10,195,617 B2
(45) Date of Patent: Feb. 5, 2019

(54) CYCLONIC SEPARATION DEVICE COMPRISING TWO CYCLONES LINKED BY AN OPTIMISED PIPE UNIT

(71) Applicants: Areva NC, Courbevoie (FR); Rolls-Royce Nuclear Field Services France, Mondragon (FR)

(72) Inventors: Jacky Jehanno, Gaujac (FR); Franck Pilisi, Codolet (FR)

(73) Assignees: ORANO CYCLE, Courbevoie (FR); ROLLS-ROYCE NUCLEAR FIELD SERVICES FRANCE, Mondragon (FR)

( * ) Notice: Subject to any disclaimer, the term of this patent is extended or adjusted under 35 U.S.C. 154(b) by 165 days.

(21) Appl. No.: 15/328,737

(22) PCT Filed: Jul. 30, 2015

(86) PCT No.: PCT/EP2015/067478
§ 371 (c)(1),
(2) Date: Jan. 24, 2017

(87) PCT Pub. No.: WO2016/016360
PCT Pub. Date: Feb. 4, 2016

(65) Prior Publication Data
US 2017/0209876 A1    Jul. 27, 2017

(30) Foreign Application Priority Data
Jul. 30, 2014 (FR) ...................................... 14 57387

(51) Int. Cl.
*B01D 45/12* (2006.01)
*B04C 5/26* (2006.01)
(Continued)

(52) U.S. Cl.
CPC ................ *B04C 5/26* (2013.01); *B01D 45/12* (2013.01); *B01D 45/16* (2013.01); *B04C 5/04* (2013.01);
(Continued)

(58) Field of Classification Search
CPC ............................... B01D 45/12; B01D 45/16
(Continued)

(56) References Cited

U.S. PATENT DOCUMENTS

| | | | |
|---|---|---|---|
| 4,853,008 A | 8/1989 | Dyson | |
| 6,428,589 B1 | 8/2002 | Bair | |

(Continued)

FOREIGN PATENT DOCUMENTS

| | | |
|---|---|---|
| CN | 2434066 Y | 6/2001 |
| EP | 0 885 585 A1 | 12/1998 |
| WO | 2014/007755 A1 | 1/2014 |

OTHER PUBLICATIONS

Search Report issued in French Patent Application No. 14 57387 dated May 22, 2015.
(Continued)

*Primary Examiner* — Robert A Hopkins
(74) *Attorney, Agent, or Firm* — Pearne & Gordon LLP

(57) ABSTRACT

A device for the cyclonic separation of solid particles contained in a fluid, comprising a primary cyclone chamber, a secondary cyclone chamber, an inlet channel for fluid loaded with solid particles opening into the primary cyclone chamber, an outlet channel for fluid cleaned of the solid particles connected to the secondary cyclone chamber, and a ducting unit connecting the primary cyclone chamber to the secondary cyclone chamber and surrounded by the primary cyclone chamber. The ducting unit comprises a core delimiting the secondary cyclone chamber and having at least one helical groove having a bottom which diverges (Continued)

away from an axis of the secondary cyclone chamber in a direction towards the latter, and a cap covering a part of the core in such a way as to delimit, with the groove, a channel connecting the primary cyclone chamber to the secondary cyclone chamber.

12 Claims, 5 Drawing Sheets

(51) Int. Cl.
      *B01D 45/16*      (2006.01)
      *B04C 5/04*       (2006.01)
      *B04C 5/103*      (2006.01)
      *B04C 5/107*      (2006.01)
      *B04C 5/13*       (2006.01)

(52) U.S. Cl.
      CPC .............. *B04C 5/103* (2013.01); *B04C 5/107* (2013.01); *B04C 5/13* (2013.01)

(58) Field of Classification Search
      USPC ........................................ 55/345, 457, 459.1
      See application file for complete search history.

(56) References Cited

U.S. PATENT DOCUMENTS

| | | | |
|---|---|---|---|
| 10,052,579 B2 * | 8/2018 | Hallgren | ................ B01D 45/16 |
| 2010/0083832 A1 | 4/2010 | Pondelick | |
| 2014/0361199 A1 | 12/2014 | Lantheaume | |
| 2016/0003671 A1 | 1/2016 | Fontbonne | |
| 2016/0003950 A1 | 1/2016 | Fontbonne | |

OTHER PUBLICATIONS

International Preliminary Report on Patentability issued in Application No. PCT/EP2015/067478 dated Jul. 12, 2016.
International Search Report issued in Application No. PCT/EP2015/067478 dated Oct. 9, 2015.

* cited by examiner

CYCLONIC SEPARATION DEVICE COMPRISING TWO CYCLONES LINKED BY AN OPTIMISED PIPE UNIT

TECHNICAL FIELD

The present invention pertains to the field of cyclonic separation of solid particles contained in a fluid, notably a gas, and more particularly relates to a device for same, comprising a primary cyclone chamber, a secondary cyclone chamber, at least one inlet channel for fluid loaded with solid particles opening into the primary cyclone chamber, at least one outlet channel for fluid cleaned of the solid particles connected to the secondary cyclone chamber, and a ducting unit connecting the primary cyclone chamber to the secondary cyclone chamber.

STATE OF THE PRIOR ART

Such a device operates by the rapid rotation of a fluid in order to separate therefrom the fine solid particles that are initially mixed therein. The separation results from the centrifugal force that tends to displace the solid particles to an outer wall. The friction of these particles along this wall in fact induces a reduction of the kinetic energy of said particles, resulting in their falling into a collection chamber provided for this purpose.

In such a device, the primary cyclone chamber, sometimes designated "primary cyclone", is connected in series to the secondary cyclone chamber, sometimes designated "secondary cyclone". The particles of larger particle size are separated in the primary cyclone chamber whereas the particles of smaller particle size are separated in the secondary cyclone chamber.

The patent U.S. Pat. No. 4,853,008 describes an example of a cyclonic separation device of known type, comprising a coaxial primary cyclone and secondary cyclone.

The two cyclones are connected in series by ducting means going along an upper part of the wall of the secondary cyclone outside thereof. These ducting means are connected upstream to the primary cyclone, and end downstream by a spiral deflection device forming an inlet of the secondary cyclone.

This device forming the inlet of the secondary cyclone extends at the upper end of the latter, at the point where the transversal extent of the secondary cyclone is maximum, in such a way as to inject air tangentially to the wall of the secondary cyclone.

Consequently, the upper part of the secondary cyclone must be housed outside of the primary cyclone in order to avoid the fluid going directly from the inlet of the primary cyclone to the inlet of the secondary cyclone and thus short-circuiting the primary cyclone. This results however in a considerable size of the device. This moreover makes it necessary to provide ducting means that are complex and of great length, likely to induce significant head loss.

In addition, the ducting means comprise an openwork wall or grid within the primary cyclone, making it possible to filter large diameter dust present in the downward flux circulating near to the aforementioned ducting means.

The presence of this grid is made necessary by the proximity between the ducting means and the flux of air loaded with solid particles entering into the primary cyclone. The drawback of such a grid however resides in its progressive clogging, as the device is used.

DESCRIPTION OF THE INVENTION

The aim of the invention is notably to provide a simple, economic and efficient solution to these problems, making it possible to avoid at least in part the aforementioned drawbacks.

The invention proposes to this end a device for the cyclonic separation of solid particles contained in a fluid, for example a gas, including:
 a primary cyclone chamber;
 a secondary cyclone chamber;
 at least one inlet channel for fluid loaded with solid particles, opening into the primary cyclone chamber;
 at least one outlet channel for fluid cleaned of the solid particles, into which opens the secondary cyclone chamber; and
 a ducting unit that connects the primary cyclone chamber to the secondary cyclone chamber, and which is surrounded by the primary cyclone chamber.

According to the invention, the ducting unit includes:
 a core forming a limit of the secondary cyclone chamber, the core having an outer surface provided with at least one helical groove having a bottom that diverges from a longitudinal axis of the secondary cyclone chamber in a direction towards this secondary cyclone chamber; and
 a cap covering a part of the core in such a way as to delimit, with the or each helical groove, a channel having an inlet opening into the primary cyclone chamber and an outlet opening into the secondary cyclone chamber.

In a manner known per se, the primary cyclone chamber is provided to separate solid particles of relatively large particle size whereas the secondary cyclone chamber is provided to separate solid particles of relatively small particle size.

The fact that the ducting unit is surrounded by the primary cyclone chamber makes it possible to reduce the overall size of the device.

The particular configuration of the ducting unit according to the invention makes it possible to bring closer the inlet of the ducting unit with respect to the longitudinal axis of this chamber, while bringing closer the outlet of the ducting unit with respect to a radially outer region of this chamber. This makes it possible to place the inlet of the secondary cyclone chamber as far as possible from a region outside of the primary cyclone chamber in which circulates the fluid loaded with solid particles of relatively large particle size, while injecting the fluid into the secondary cyclone chamber near to the wall externally delimiting this chamber.

The risk that such solid particles penetrate directly into the secondary cyclone chamber in short-circuiting the primary cyclone chamber is thus reduced to the minimum. The invention makes it possible in particular to maintain this risk at the minimum even in a configuration where the inlet of the secondary cyclone chamber is positioned axially near to the inlet of the primary cyclone chamber.

Such a positioning of the secondary cyclone chamber with respect to the primary cyclone chamber is encountered in particular in a preferred embodiment of the invention, in which the secondary cyclone chamber is integrally surrounded by the primary cyclone chamber.

Furthermore, the outlet channel of the device extends advantageously through the core, along the longitudinal axis of the secondary cyclone chamber.

In addition, a part at least of the outlet channel of the device is preferably delimited by a surface provided with vortex breaker splines.

Such splines, extending parallel to the longitudinal axis of the secondary cyclone chamber, make it possible to break the rotation of the fluid at the outlet of the device.

Preferably, the outer surface of the core comprises several helical grooves regularly distributed around the longitudinal axis of the secondary cyclone chamber.

Preferably, the cap is formed of a wall of revolution centred with respect to the longitudinal axis of the secondary cyclone chamber.

The cap is advantageously modelled in such a way as to diverge from the longitudinal axis of the secondary cyclone chamber in a direction towards this secondary cyclone chamber.

Seen along a plane going through the longitudinal axis of the secondary cyclone chamber, the cap thus has a curvature similar to the curvature of the bottom of the or each helical groove. The radial extent of the channel delimited by the cap and by the helical groove may thus be maintained constant from one end to the other of this channel.

Preferably, the primary cyclone chamber is delimited externally by an outer annular wall centred with respect to the longitudinal axis of the secondary cyclone chamber and comprising a convergent tapered portion.

The outer annular wall advantageously includes a divergent tapered portion connected to the convergent tapered portion of the outer annular wall at the level of a neck of the latter.

Preferably, the secondary cyclone chamber is delimited externally by an inner annular wall comprising a convergent tapered portion and a divergent tapered portion connected to each other at the level of a neck of the inner annular wall.

Furthermore, the primary cyclone chamber preferably opens into a primary collection chamber intended to receive the solid particles separated within this primary cyclone chamber.

In addition, the device advantageously includes first vortex breaker blades at the outlet of the primary cyclone chamber.

Such blades form an obstacle to the swirling fluid, liable to break the rotation of this fluid and thus limit the resuspension of fine solid particles. These blades thus make it possible to reduce the risks that the solid particles collected in the primary collection chamber are carried along by the vortex circulating within the primary cyclone chamber.

In an analogous manner, the secondary cyclone chamber preferably opens into a secondary collection chamber intended to receive the solid particles separated within the secondary cyclone chamber.

In addition, the device advantageously includes second vortex breaker blades at the outlet of the secondary cyclone chamber.

These blades make it possible to reduce the risks that the solid particles collected in the secondary collection chamber are carried along by the vortex circulating within the secondary cyclone chamber.

Furthermore, the inlet channel opening into the primary cyclone chamber preferably has a helical shape.

The fluid admitted into the device may thus be injected into the primary cyclone chamber tangentially to the outer wall thereof, and in a sloping direction to the opposite end of the chamber.

BRIEF DESCRIPTION OF THE DRAWINGS

The invention will be better understood, and other details, advantages and characteristics thereof will become clearer on reading the following description given as a non-limiting example and with reference to the appended drawings in which.

In all of these figures, identical references may designate identical or analogous elements.

DETAILED DESCRIPTION OF A PREFERRED EMBODIMENT

Figure 1:
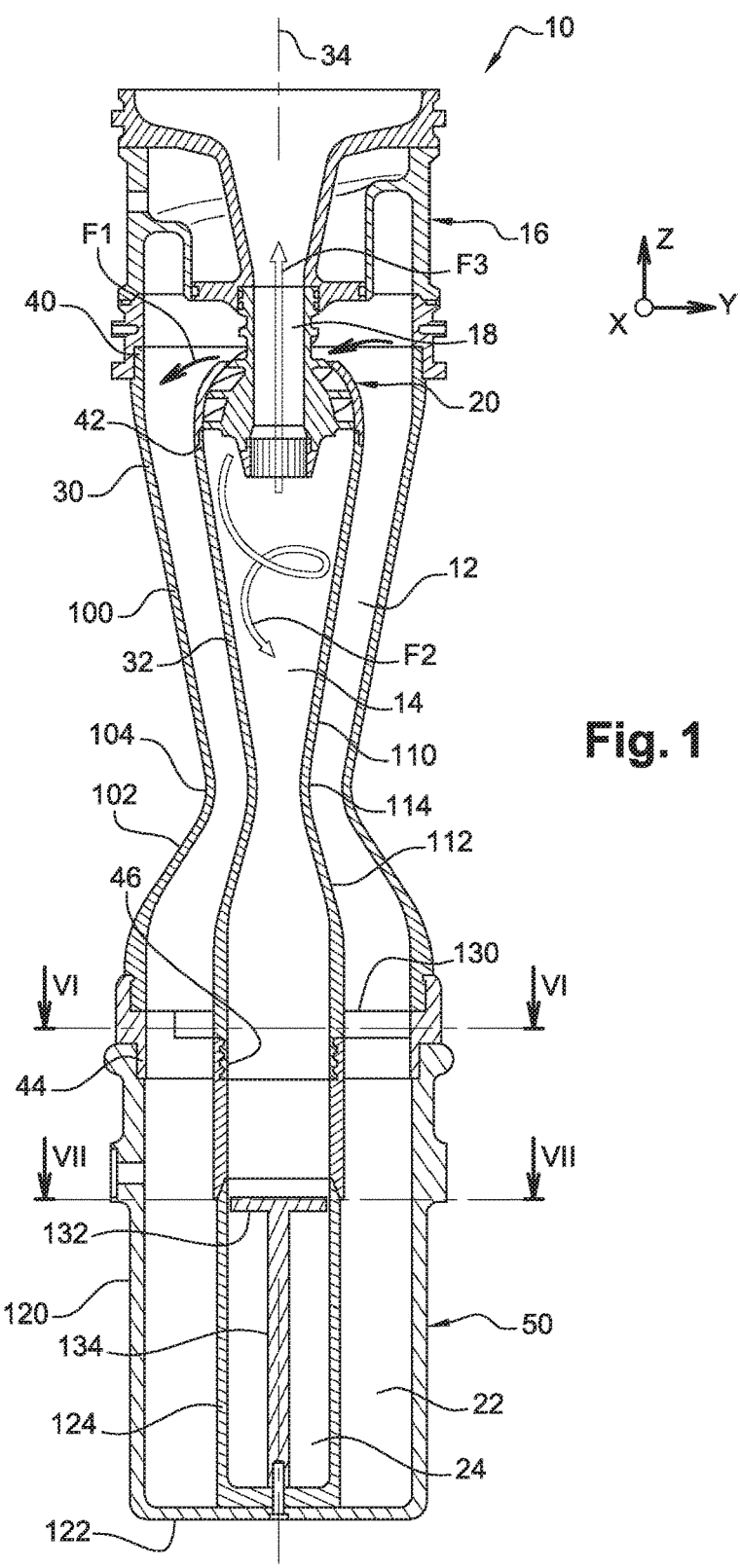
FIG. 1 is a partial schematic view in longitudinal section of a device according to a preferred embodiment of the invention.

FIG. 1 illustrates a device 10 for the cyclonic separation of solid particles contained in a fluid, such as a gas or a liquid, according to a preferred embodiment of the invention.

For convenience, the description that follows is made with reference to an orthonormal system X, Y, Z.

Generally speaking, the device 10 comprises a primary cyclone chamber 12, a secondary cyclone chamber 14, an inlet head 16 for the admission of fluid loaded with solid particles into the primary cyclone chamber, an outlet channel 18 connected to the secondary cyclone chamber 14 to enable the escape of fluid cleaned of the solid particles, a ducting unit 20 fluidly connecting the primary cyclone chamber 12 to the secondary cyclone chamber 14, a primary collection chamber 22 for collecting solid particles of large particle size, and a secondary collection chamber 24 for collecting solid particles of smaller particle size.

The primary cyclone chamber 12 is delimited externally by an outer annular wall 30, and is delimited internally by an inner annular wall 32 that delimits externally the secondary cyclone chamber 14. This secondary cyclone chamber 14 thus extends into the volume delimited by the inner annular wall 32 and is thus entirely surrounded by the primary cyclone chamber 12.

In the example illustrated, the annular walls 30 and 32 are centred with respect to a same longitudinal axis 34 parallel to the Z axis, which thus forms a longitudinal axis of each of the cyclonic chambers 12 and 14.

The inlet head 16 is mounted on a first longitudinal end 40 of the outer annular wall 30, and the ducting unit 20 is mounted on a first longitudinal end 42 of the inner annular wall 32, situated on the same side as the inlet head 16.

The annular walls 30 and 32 have respectively second longitudinal ends 44 and 46 on which is mounted a collection module 50 that integrates the collection chambers 22 and 24.

According to the invention, the ducting unit 20 includes a core 60 and a cap 62, which appear more clearly in FIGS. 2 to 5.

The core 60 (FIG. 4) has an outer surface 64 provided with helical grooves 66. These grooves are delimited by threads 68 extending from a heart 70 of the core (FIG. 5). In the terminology of the invention, the outer surface 64 is thus defined as being constituted by all the respective outer edges of the threads 68.

Figure 4:
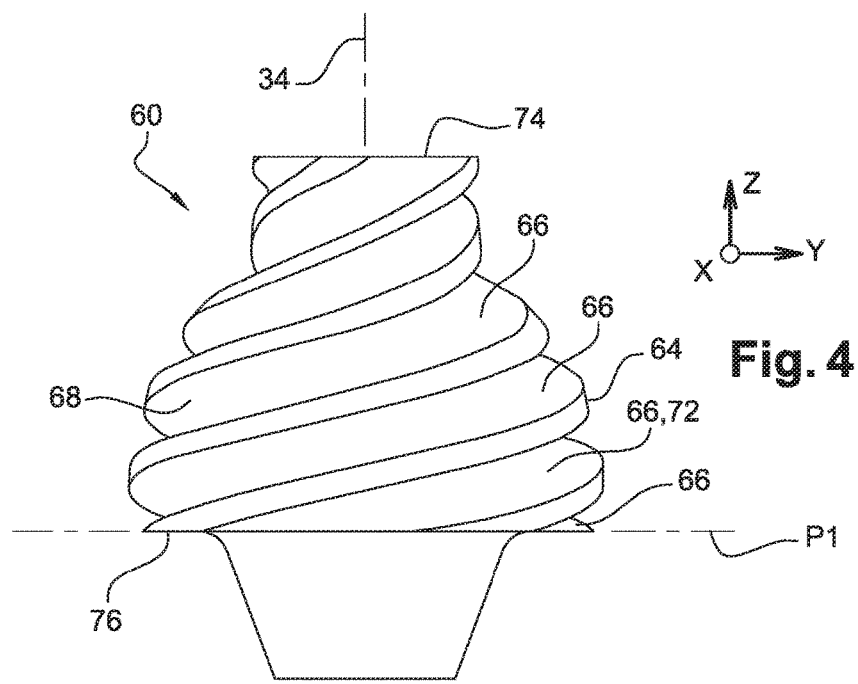
FIG. 4 is a perspective schematic view of a core belonging to the device of FIG. 1.
Figure 5:
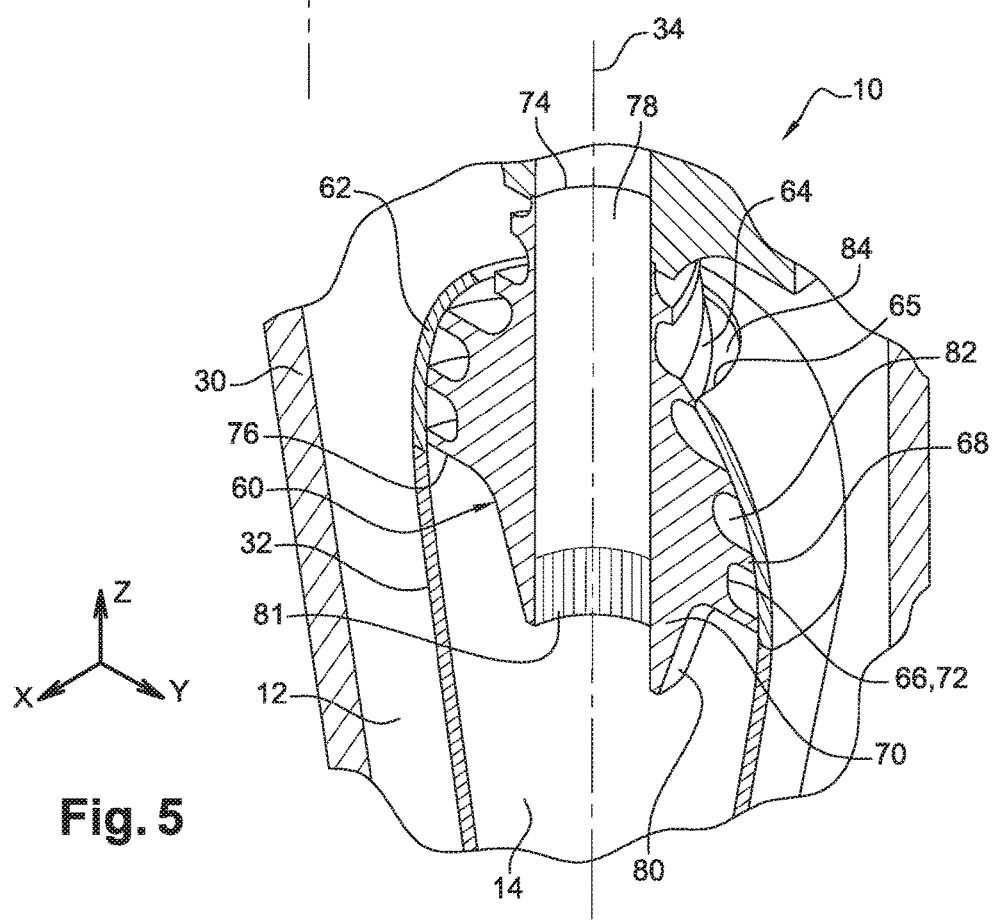
FIG. 5 is a schematic view in perspective and in longitudinal section of a part of the device of FIG. 1.

In the example illustrated, the grooves 66 are four in number (FIG. 4). These grooves 66 are distributed regularly around the longitudinal axis of the core 60, which merges with the longitudinal axis 34 of the cyclone chambers. In the example illustrated, each groove 66 is thus shifted angularly by 90 degrees with respect to the groove that is consecutive thereto in each circumferential direction, this angular shift being naturally defined around the longitudinal axis 34.

The core 60 is modelled such that the bottom 72 of each of the helical grooves 66 diverges from the longitudinal axis 34 in a direction towards the secondary cyclone chamber 14, that is to say in the direction of the decreasing dimensions Z. More precisely, the transversal section of the core widens from a first longitudinal end 74 thereof, situated on the side of the inlet head 16, that is to say on the side of the increasing dimensions Z, up to a second longitudinal end 76 thereof situated on the opposite side (FIG. 4). This second longitudinal end 76 forms a limit of the secondary cyclone chamber 14 and is inscribed in a transversal plane P1. Each of the helical grooves 66 opens into the secondary cyclone chamber 14 at the level of this transversal plane P1.

Figure 2:
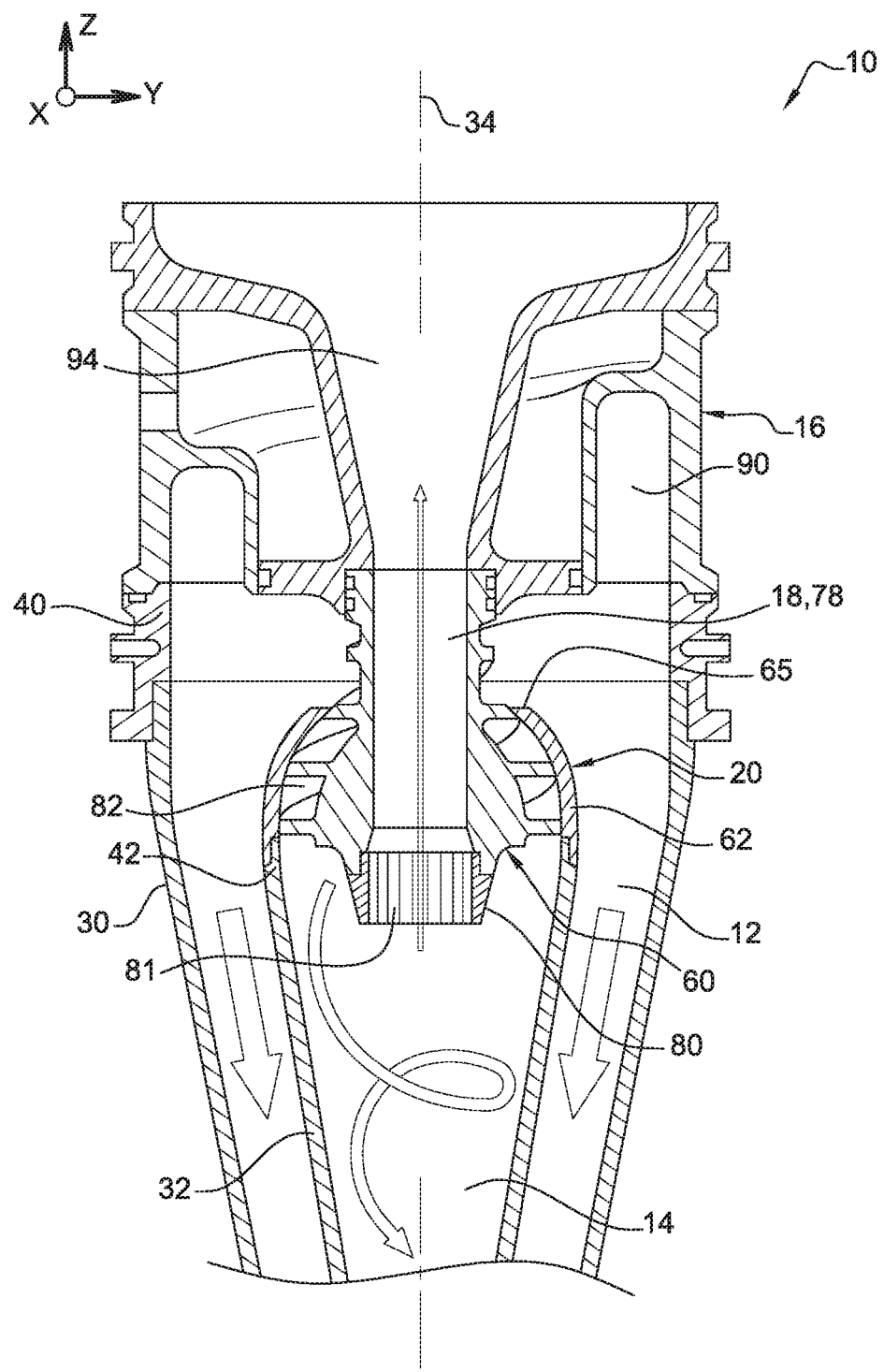
FIG. 2 is a larger scale view of a part of FIG. 1.
Figure 3:
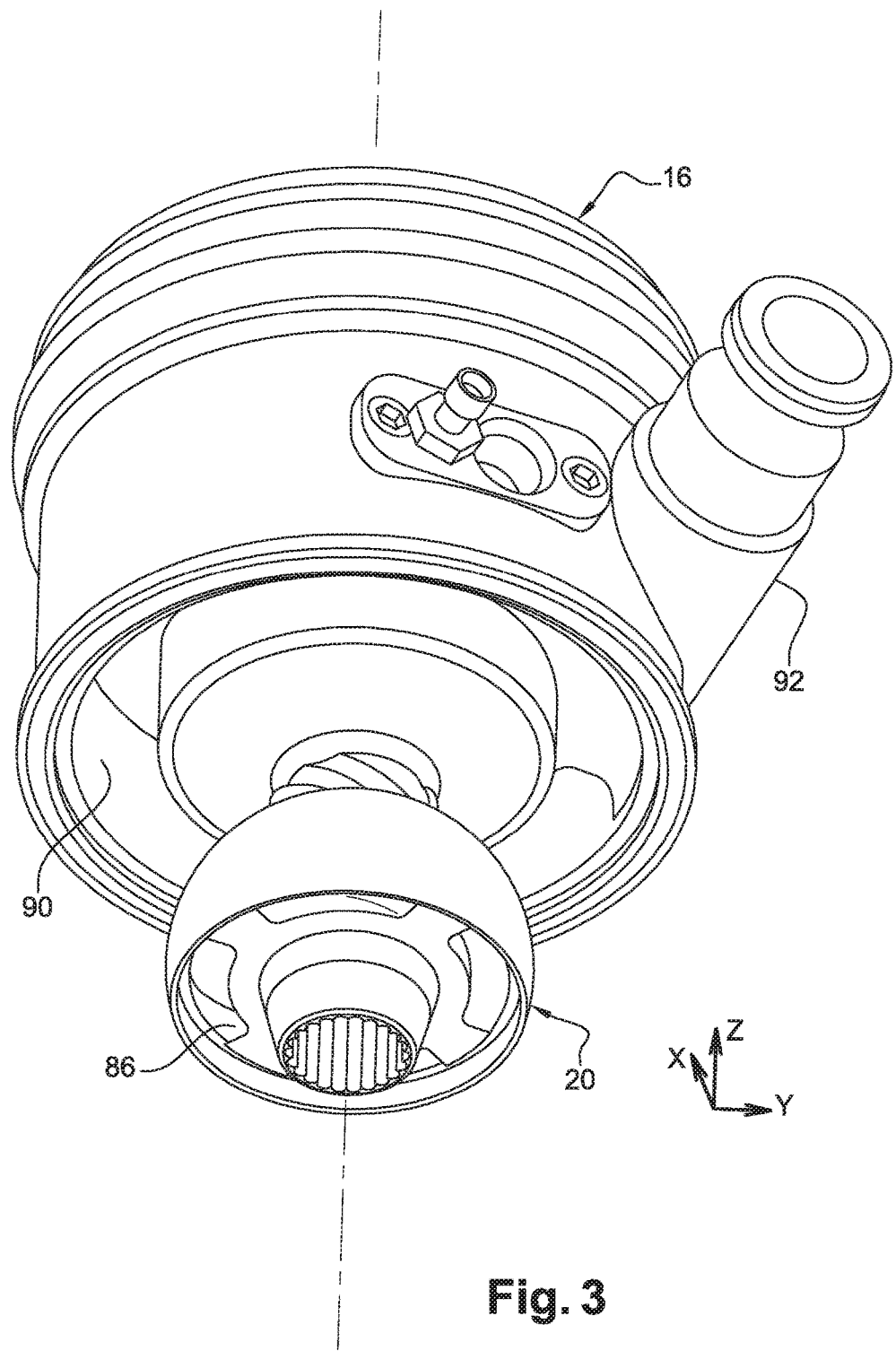
FIG. 3 is a perspective schematic view of a part of the device of FIG. 1.

As shown in FIGS. 2, 3 and 5, the core 60 includes a central longitudinal channel 78 which is open in the first longitudinal end 74 of the core and in the second longitudinal end 76 thereof. The channel 78, which thus traverses the core from end to end, forms a part of the outlet channel 18 of the device.

In the example illustrated, the core 60 comprises an aerodynamic annular spout 80 extending projecting beyond the second longitudinal end 76 of the core, in the secondary cyclone chamber 14, in such a way as to prolong the central longitudinal channel 78 to channel the fluid to the inlet of this channel 78 (FIG. 5). The inner surface of the spout 80 is provided with longitudinal splines 81 called "vortex breaker splines" hereafter.

The cap 62 (FIGS. 3 and 5) has a shape complementary to that of a part of the outer surface 64 of the core, which the cap covers. The cap 62 thus advantageously takes the shape of an annular wall concave in the direction of the core 60. The cap 62 is for example of spherical crown, ellipsoid crown or ovoid shape. The cap 62 has an upper opening 65 traversed by the core 60 (FIGS. 2 and 5). The latter thus has an upper uncovered portion.

Generally speaking, the cap 62 delimits with each of the helical grooves 66 a helical channel 82 having an inlet 84 (FIG. 5) connected to the primary cyclone chamber 12 and an outlet 86 (FIG. 3) connected to the secondary cyclone chamber 14. The respective inlets 84 of the helical channels 82 are formed in the opening 65 of the cap 62.

The cap 62 is thus modelled in such a way as to diverge from the longitudinal axis 34 in a direction towards the secondary cyclone chamber 14.

Seen along the plane of FIG. 2 that passes through the longitudinal axis 34, the cap 62 thus has a curvature similar to the curvature of the bottom of each helical groove 66. The radial extent of each helical channel 82 may thus be maintained constant from one end to the other of this channel.

As FIGS. 2 and 3 show, the inlet head 16 integrates a helical inlet channel 90 having an end opening into the primary cyclone chamber 12 and an opposite end connected to an inlet fitting 92 (FIG. 3) intended to be connected to a tubing for supplying the device with fluid to clean.

The inlet head 16 further includes a conduit 94 (FIG. 2), for example of tapered shape, which prolongs the central longitudinal channel 78 of the core 60 and which communicates with the outside of the device to enable the evacuation of air cleaned of solid particles.

As is shown in FIG. 1, the outer annular wall 30 comprises a convergent tapered portion 100 and a divergent tapered portion 102 connected to each other at the level of a neck 104 of the outer annular wall 30. The convergent portion 100 has a transversal section of diameter narrowing in the direction of the decreasing dimensions Z, whereas the divergent tapered portion 102 has a transversal section of diameter widening in the direction of the decreasing dimensions Z. The outer annular wall 30 thus has a convergent-divergent profile.

In an analogous manner, the inner annular wall 32 includes a convergent tapered portion 110 and a divergent tapered portion 112 connected to each other at the level of a neck 114 of the inner annular wall 32. The convergent portion 110 has a transversal section of diameter narrowing in the direction of the decreasing dimensions Z, whereas the divergent tapered portion 112 has a transversal section of diameter widening in this same direction. The inner annular wall 32 thus also has a convergent-divergent profile.

The neck 114 of the inner annular wall 32 is positioned axially facing the neck 104 of the outer annular wall 30. In addition, the convergent tapered portion 110 of the inner annular wall 32 is positioned axially facing the convergent tapered portion 100 of the outer annular wall 30, whereas the divergent tapered portion 112 of the inner annular wall 32 is positioned facing the divergent tapered portion 102 of the outer annular wall 30.

The collection module 50 comprises an outer wall 120 of cylindrical shape of circular section, which extends into the prolongation of the outer annular wall 30 and is closed at its lower end by a bottom 122, as well as an inner wall 124 also of cylindrical shape of circular section, which extends into the prolongation of the inner annular wall 32.

The primary collection chamber 22 thus extends into the prolongation of the primary cyclone chamber 12 whereas the secondary collection chamber 24 extends into the prolongation of the secondary cyclone chamber 14. Each collection chamber is connected in a substantially leak tight manner to the associated cyclone chamber.

Figure 6:
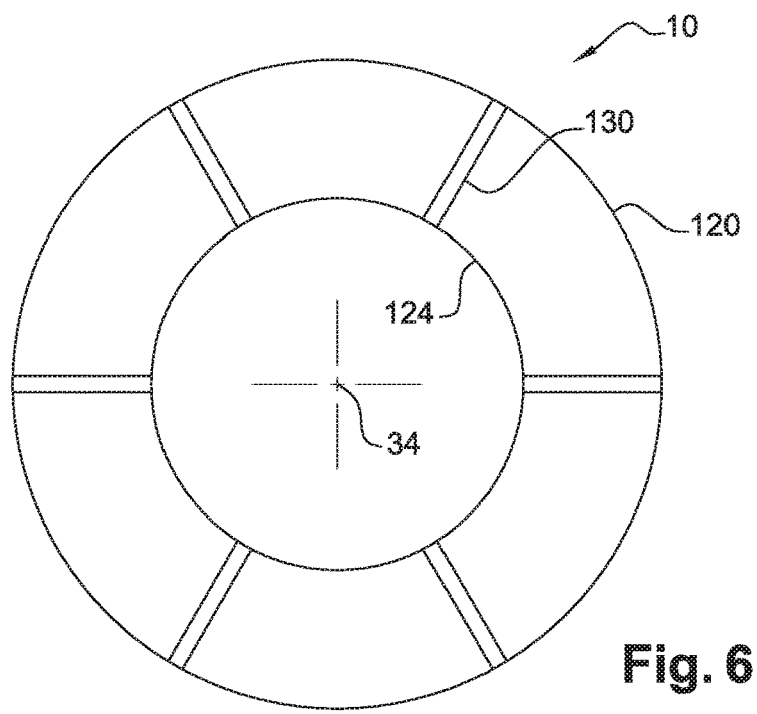
FIGS. 6 and 7 are schematic views of the device of FIG. 1, respectively in transversal section along the planes VI-VI and VII-VII of FIG. 1.

The device 10 moreover comprises first vortex breaker blades 130 at the outlet of the primary cyclone chamber 12 (FIGS. 1 and 6). These first blades 130 extend radially and connect the respective second longitudinal ends 44 and 46 of the annular walls 30 and 32 to each other. These first blades 130 are regularly distributed around the longitudinal axis 34 and are for example six in number. In a variant, the first blades may connect the inner wall 124 of the collection module 50 to the outer wall 120 thereof.

Figure 7:
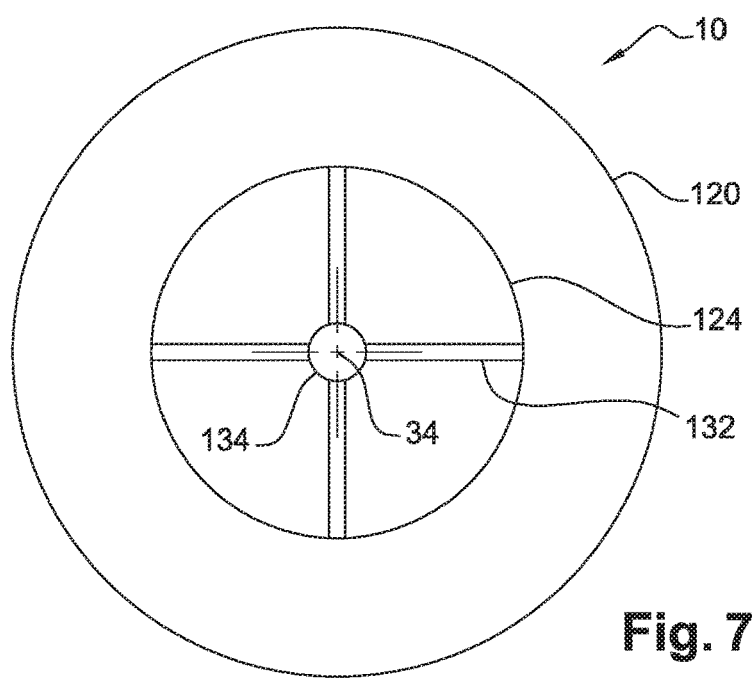

In an analogous manner, the device 10 includes second vortex breaker blades 132 at the outlet of the secondary cyclone chamber 14 (FIGS. 1 and 7). These second blades 132, regularly distributed around the longitudinal axis 34, extend radially and are for example four in number. In the example illustrated, the second blades 132 connect the inner wall 124 of the collection module 50 to a central longitudinal pillar 134 fixed to the bottom 122 of this module 50.

It should be noted that the means enabling the fluid to be made to move may be of any suitable conventional type and will not be described in detail in the present description. These means typically comprise a motorised propeller laid out at the outlet of the conduit 94, for example in an enlarged space connected to this conduit 94.

The operation of the device 10 will now be described.

The fluid loaded with solid particles is brought by a tubing connected to the inlet fitting 92 and penetrates through the latter into the inlet channel 90, which transmits a swirling movement to the fluid.

The fluid coming from the inlet channel 90 thus penetrates into the primary cyclone chamber while having a direction substantially tangential to the outer annular wall 30 and forming an acute angle with respect to a transversal plane, such that the rotational movement of the fluid has a component oriented in the direction of the decreasing dimensions Z (FIG. 1: arrow F1).

On account of the configuration of the ducting unit 20, the fluid coming from the inlet channel 90 remains relatively far away from the respective inlets 84 of the helical channels 82 leading to the secondary cyclone chamber 14, such that the risk of "short circuit" or "by-pass" of the primary cyclone chamber 12 is reduced to the minimum, despite the axial proximity between the inlets 84 on the one hand and the outlet of the inlet channel 90 on the other hand.

In the primary cyclone chamber 12, solid particles of large particle size are separated from the fluid by a cyclonic effect placing in opposition the centrifugal force, which depends on the mass and on the speed of the particles and on the radius of curvature of their trajectory, and the centripetal force induced by the low pressure gradient within the flux. This cyclone effect is maximised on account of the convergent-divergent profile of the outer annular wall 30. Solid particles of large particle size lose their kinetic energy by friction and fall into the primary collection chamber 22. In addition, the positioning of the secondary cyclone within the primary cyclone makes it possible to destroy any rising vortex of the type normally present in a traditional cyclone. The risk of solid particles being picked up by such a rising vortex may thus be avoided.

The first vortex breaker blades 130 make it possible to interrupt the swirling flux at the inlet of the primary collection chamber 22 and to even further reduce the risks of solid particles returning into the primary cyclone chamber 12.

At the level of the upper uncovered part of the core 60, the swirling fluid takes the shape of a spiral of which the radially internal part, cleaned of solid particles of large particle size, penetrates into the respective inlets 84 of the helical channels 82 of the ducting unit 20.

The fluid flows through these helical channels 82 while being channelled by the threads 68 and the cap 62 which contribute to maintaining the rotational movement of the fluid and enable an injection of the latter into the secondary cyclone chamber 14 along an orientation substantially tangential to the inner annular wall 32 and forming an acute angle with respect to a transversal plane, such that the rotational movement of the fluid here again has a component oriented in the direction of the decreasing dimensions Z (FIG. 1: arrow F2).

Within the secondary cyclone chamber 14, solid particles of relatively small particle size are separated from the fluid by a cyclone effect analogous to the effect described above. These solid particles lose their kinetic energy through friction and fall into the secondary collection chamber 24.

The second vortex breaker blades 132 make it possible to interrupt the swirling flux at the inlet of the secondary collection chamber 24 and thus reduce the risks of solid particles returning into the secondary cyclone chamber 14.

The fluid cleaned of solid particles flows to the increasing dimensions Z at the centre of the secondary cyclone chamber from the base of the latter, then penetrates into the central longitudinal channel 78 of the core 60 while being channelled by the aerodynamic annular spout 80 (FIG. 1: arrow F3). The vortex breaker splines 81 make it possible to perturb any potential swirling movement of the fluid at the inlet of the channel 78.

The fluid finally escapes from the device via the conduit 94.

The invention thus offers a cyclonic separation device combining optimal performances with reduced size.

The invention claimed is:

1. A device for the cyclonic separation of solid particles contained in a fluid, comprising:
    a primary cyclone chamber;
    a secondary cyclone chamber;
    at least one inlet channel for fluid loaded with solid particles, opening into said primary cyclone chamber;
    at least one outlet channel for fluid cleaned of the solid particles, into which opens said secondary cyclone chamber; and
    a ducting unit connecting said primary cyclone chamber to said secondary cyclone chamber;
    in which said ducting unit is surrounded by the primary cyclone chamber;
    wherein said ducting unit comprises:
    a core forming a limit of said secondary cyclone chamber, said core having an outer surface provided with at least one helical groove having a bottom that diverges from a longitudinal axis of said secondary cyclone chamber in a direction towards said secondary cyclone chamber; and
    a cap covering a part of said core in such a way as to delimit, with said at least one helical groove, a helical channel having an inlet opening into said primary cyclone chamber and an outlet opening into said secondary cyclone chamber.

2. The device according to claim 1, in which the secondary cyclone chamber is integrally surrounded by the primary cyclone chamber.

3. The device according to claim 1, in which the outlet channel of the device extends through the core, along the longitudinal axis of the secondary cyclone chamber.

4. The device according to claim 3, in which a part at least of the outlet channel of the device is delimited by a surface provided with vortex breaker splines.

5. The device according to of claim 1, in which said at least one helical groove comprises several helical grooves regularly distributed around the longitudinal axis of the secondary cyclone chamber.

6. The device according to claim 1, in which the cap is formed of a wall of revolution centred with respect to the longitudinal axis of the secondary cyclone chamber.

7. The device according to claim 1, in which the primary cyclone chamber is delimited externally by an outer annular wall centred with respect to the longitudinal axis of the secondary cyclone chamber and including a convergent tapered portion.

8. The device according to claim 7, in which said outer annular wall a divergent tapered portion connected to the convergent tapered portion of said outer annular wall at the level of a neck of the latter.

9. The device according to claim 1, in which the secondary cyclone chamber is delimited externally by an inner annular wall comprising a convergent tapered portion and a divergent tapered portion connected to each other at the level of a neck of said inner annular wall.

10. The device according to claim 1, in which the primary cyclone chamber opens into a primary collection chamber intended to receive the solid particles separated within the primary cyclone chamber, the device including first vortex breaker blades at the outlet of the primary cyclone chamber.

11. The device according to claim 1, in which the secondary cyclone chamber opens into a secondary collection chamber intended to receive the solid particles separated within the secondary cyclone chamber, the device including second vortex breaker blades at the outlet of the secondary cyclone chamber.

12. The device according to claim 1, in which said at least one inlet channel has a helical shape.

\* \* \* \* \*